(12) United States Patent
Liu

(10) Patent No.: US 6,795,156 B2
(45) Date of Patent: Sep. 21, 2004

(54) ORIENTATION INSPECTOR FOR LIQUID CRYSTAL DISPLAY (LCD) CELL

(75) Inventor: Kang Ting Liu, Kaohsiung (TW)

(73) Assignee: Hannstar Display Corp. (TW)

( * ) Notice: Subject to any disclaimer, the term of this patent is extended or adjusted under 35 U.S.C. 154(b) by 125 days.

(21) Appl. No.: 09/947,383

(22) Filed: Sep. 7, 2001

(65) Prior Publication Data

US 2002/0060755 A1 May 23, 2002

(30) Foreign Application Priority Data

Nov. 20, 2000 (TW) ...................................... 89220250 U

(51) Int. Cl.⁷ ................................................ G02F 1/13
(52) U.S. Cl. .......................... 349/199; 369/1; 369/192; 369/54; 369/139; 369/182; 369/149; 369/126; 369/12
(58) Field of Search ................................ 349/199, 192, 349/54, 139, 181, 149, 201, 176, 12, 1, 770

(56) References Cited

U.S. PATENT DOCUMENTS

| | | | | |
|---|---|---|---|---|
| 5,012,314 A | * | 4/1991 | Tobita et al. .................. | 357/23 |
| 5,258,705 A | * | 11/1993 | Okamoto et al. ........... | 324/158 |
| 5,535,306 A | * | 7/1996 | Stevens ....................... | 700/254 |
| 5,537,311 A | * | 7/1996 | Stevens ....................... | 700/57 |
| 5,636,960 A | * | 6/1997 | Hiroki et al. ............... | 414/331 |
| 5,872,610 A | * | 2/1999 | Kobayashi .................. | 349/139 |
| 5,959,713 A | * | 9/1999 | Kobayashi .................. | 349/192 |
| 5,980,195 A | * | 11/1999 | Miyashita .................... | 414/783 |
| 6,203,268 B1 | * | 3/2001 | Miyashita .................... | 414/757 |
| 6,444,996 B1 | * | 9/2002 | Boenick et al. ........ | 250/559.36 |
| 6,525,799 B1 | * | 2/2003 | Fukuda ........................ | 349/157 |
| 2002/0078889 A1 | * | 6/2002 | Welsh et al. ................ | 118/668 |

FOREIGN PATENT DOCUMENTS

| | | | |
|---|---|---|---|
| JP | 09069548 | * | 3/1997 |
| JP | 09138256 | * | 5/1997 |

* cited by examiner

*Primary Examiner*—Nathan J. Flynn
*Assistant Examiner*—Fazli Erdem

(57) ABSTRACT

An orientation inspector for LCD cell is utilized to inspect the LCD cell. The LCD cell includes two transparent substrates wherein the first transparent substrate is slightly bigger than the second transparent substrate and a step is formed on the first transparent substrate along the two side edges thereof. The orientation inspector for LCD cell comprises a main body connected to a hoister which can lower the main body to a predetermined position to stop the step at side edge of the LCD cell; a sensor disposed in the main body for detecting the step at side edge of the LCD cell below the main body, wherein when the body stops the step at side edge of the LCD cell and the sensor detects the step on the first transparent substrate, the sensor will confirm that the LCD cell is at correct orientation, and when the main body stops the side edge of the LCD cell and the sensor can not detect the step on the first transparent substrate, the sensor will confirm that the LCD cell is not at correct orientation.

9 Claims, 2 Drawing Sheets

ORIENTATION INSPECTOR FOR LIQUID CRYSTAL DISPLAY (LCD) CELL

FIELD OF THE INVENTION

The present invention generally relates to an orientation inspector, and more particularly, to an orientation inspector for liquid crystal display (LCD) cell to ensure the orientation of the LCD cell for the convenience of the subsequent manufacturing processes.

BACKGROUND OF THE INVENTION

Due to the advance of electronic technology, especially for the popularity of portable electronic products, the requirements of light, compact and low-energy consuming display are gradually increasing. With the advantages of low-energy consuming, low-heat dissipation, light weight and non-luminescence display, liquid crystal displays (LCD) have been widely used in the electronic products and even have replaced the traditional CRT displays.

A LCD is basically consisted of polarizers, glass electrodes and liquid crystal materials. The polarizers are made of the polarizer material sandwiched between two transparent films. The glass electrodes are made of high quality flat glass which is plated with a layer of conductive film of metallic oxidation. The molecules of liquid crystal material possess very strong electron conjugation moving ability. When the liquid crystal molecules are applied with electric field, they are easily polarized to produce induced dipolar phenomena, thereby resulting in the displaying image in the LCD.

The manufacturing process of LCD substantially includes the steps of injecting the liquid crystal material into the space between the two flat glasses with glass electrodes thereon, and adhering polarizer films onto the outer surfaces of the flat glasses so as to form the LCD cell. Then the driving circuits, controlling circuit, and backlight components etc. will be assembled to constitute a LCD module.

As set forth in the foregoing description, the LCD cell substantially comprises two glass substrates with different dimensions, wherein one glass substrate protrudes to another glass substrate. Therefore, a step is formed on the bigger glass substrate along the two side edges thereof. The driving circuits and controlling circuits are disposed on the step at side edges. For conventional LCD manufacturing process, the orientation of the step of the LCD cell is usually checked by operators. However, since the step at the side edges is relatively narrow and several films have been attached onto the LCD cell, it is quite difficult and time consuming to ensure the orientation of the step of the LCD cell by operator's eye sight.

Accordingly, there exists the needs for providing an inspection instrument for LCD manufacturing to ensure the correct orientation of the step of the LCD cell.

SUMMARY OF THE INVENTION

It is a primary object of the present invention to provide an orientation inspector for liquid crystal display (LCD) cell to ensure the orientation of the LCD cell for the convenience of the subsequent manufacturing processes.

It is another object of the present invention to provide an orientation inspector for liquid crystal display (LCD) cell to inspect the position of LCD cell.

According to the objects of the present invention, the orientation inspector for liquid crystal display (LCD) cell is utilized to inspect LCD cells including two transparent substrates, wherein the first transparent substrate is slightly bigger than the second transparent substrate and a step is formed on the first transparent substrate along the two side edges thereof. The orientation inspector for liquid crystal display (LCD) cell mainly comprises:

a main body connected to a hoister which can lower the main body to a predetermined position to stop the side edge of the LCD cell;

a sensor disposed in the main body for detecting the side edge of the LCD cell below the main body, wherein when the man body stops the side edge of the LCD cell and the sensor detects the step on the first transparent substrate, the sensor will confirm that the LCD cell is at correct orientation, and when the main body stops the side edge of the LCD cell and the sensor can not detect the step on the first transparent substrate, the sensor will confirm that the LCD cell is not at correct orientation.

According to another aspect of the present invention, the sensor of the orientation inspector for liquid crystal display (LCD) cell is an optical sensor.

According to a further aspect of the present invention, the orientation inspector for liquid crystal display (LCD) cell further comprises a side wall with a predetermined thickness to position the LCD cell.

According to the present invention, the orientation inspector for liquid crystal display (LCD) cell utilizes a sensor to inspect the orientation of the LCD cell so as to significantly reduce the inspection time required for ensuring the correct orientation of the LCD cell during the LCD manufacturing processes.

Other objects, advantages, and novel features of the invention will become more apparent from the following detailed description when taken in conjunction with the accompanying drawings.

DESCRIPTION OF THE PREFERRED EMBODIMENT

Figure 1:
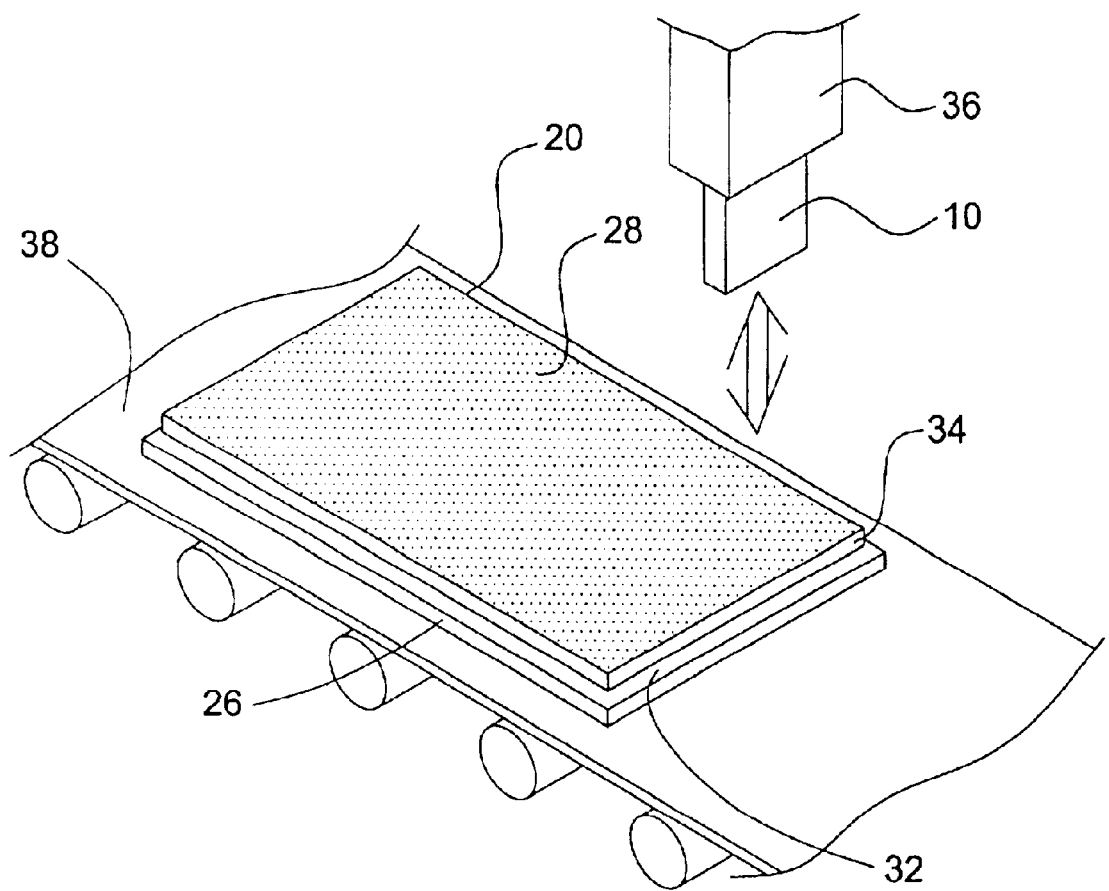
FIG. 1 is a perspective view of the orientation inspector for liquid crystal display (LCD) cell utilized to inspect the LCD cell.

Referring to FIG. 1, it depicts the orientation inspector of LCD cell 10 according to the preferred embodiment of the present invention, which is used to inspect the LCD cell 20. The LCD cell includes two flat substrates of transparent material, such as high quality flat glass, wherein the first transparent substrate 26 is slightly bigger than the second transparent substrate 28. Accordingly, when the two transparent substrates 26, 28 are combined with each other to form the LCD cell 20, the first transparent glass 26 will extend outwardly from the side edge of the second transparent substrate 28 to form a step 32 and a shoulder 34 on the first transparent substrate 26 along the two side edges thereof.

In the process of manufacturing LCD, driving circuits and controlling circuits are disposed on the step 32 at side edge. For conventional LCD manufacturing process, no suitable instrument is provided to ensure the step at side edge is at correct orientation or to ensure of the orientation of the LCD cell 20. In the other words, it is not ensured that the first transparent glass substrate 26 is under the second transparent glass substrate 28 such that the driving circuits and the controlling circuits can be conveniently attached onto the step 32. Furthermore, since the step 32 at side edge is relatively narrow, it is quite difficult and time-consuming to ensure of the orientation of the LCD cell 20 by the operator's eye sight.

When manufacturing, the LCD cell 20 is transported by the conveyor belt 38 and the orientation inspector 10 is connected to a hoister 36 which can lift the inspector 10 to permit the passage of the LCD cell 20 and lower the inspector 10 to stop the LCD cell 20 for inspecting the orientation of the LCD cell 20. It should be understood by the people skilled in this art that the orientation 10 is not merely for the inspection of the orientation of the LCD cell but also for ensuring the position of the LCD cell 20. In other words, the orientation inspector 10 can function as a stopper.

Figure 2:
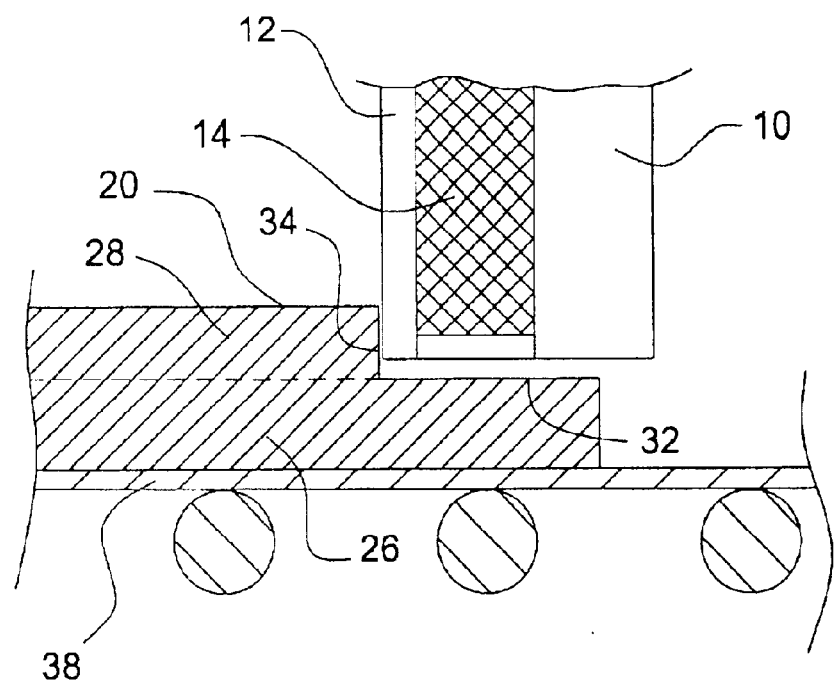
FIG. 2 is an enlarged sectional view of the orientation inspector for liquid crystal display (LCD) cell, wherein the LCD cell is at correct orientation.

Now referring to FIG. 2, it shows the operation of the LCD cell orientation inspector 20 according to the embodiment of the invention and the correct orientation of the LCD cell 20. The orientation inspector 10 is provided with an optical fiber 14 for detecting the first transparent glass substrate 26. When the orientation inspector 10 is lowered to the level between the upper surface of the first transparent glass substrate 26 and the upper surface of the second transparent glass substrate 28 and the LCD cell 20 is transported by the conveyor belt, the shoulder 34 of the LCD cell 20 will contact the orientation inspector 10. Because the side wall 12 of the orientation inspector has a specific thickness, the step 32 at side edge is positioned below the optical fiber 14 and can be sensed by the optical fiber 14 and thus the correct orientation of the LCD cell 20 can be ensured. If the orientation of the LCD cell is not correct (as shown in FIG. 3), the optical fiber 14 can not sense the first transparent glass substrate 26 and thus the incorrect orientation of the LCD cell can be ensured.

Figure 3:
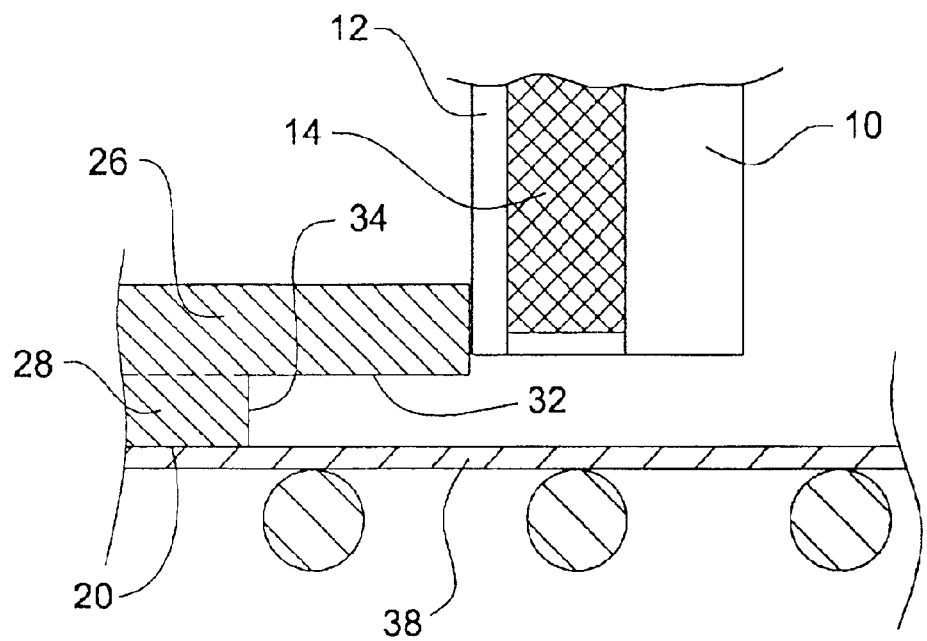
FIG. 3 is an enlarged sectional view of the orientation inspector for liquid crystal display (LCD) cell, wherein the LCD cell is at incorrect orientation.

Alternatively, in the process of manufacturing of the LCD cell 20, the orientation of the LCD cell 20 shown in FIG. 3 is correct while the orientation of the LCD cell 20 shown in FIG. 2 is not correct. In such state, the orientation inspector 10 is also lowered to a predetermined level to contact the shoulder 34. If the orientation inspector 10 can not sense the step 32 at side edge, it means that the LCD cell is at correct orientation. On the contrary, when the orientation inspector 10 can sense the step 32 at side edge, it means that the LCD cell is at wrong orientation.

It should be appreciated by the people skilled in the art that the optical fiber 14 is used for detecting and transferring the detecting signal to an optical sensor or the optical fiber 14 can transfer the output light from the LCD cell 20 to the sensor in the other side to sense the step 32 at side edge so as to ensure the orientation of the LCD cell 20.

As set forth in foregoing description, the sidewall 12 of the orientation inspector 10 has a predetermined thickness. Therefore, the optical fiber 14 can also be used for ensuring the position of the LCD cell 20.

Although the invention has been explained in relation to its preferred embodiment, it is not used to limit the invention. It is to be understood that many other possible modifications and variations can be made by any people skilled in the art without departing from the spirit and scope of the invention as hereinafter claimed.

What is claimed is:

1. An orientation inspector for inspecting a liquid crystal display (LCD) cell including two transparent substrates wherein the first transparent substrate thereof is slightly bigger than the second transparent substrate such that the LCD cell is provided with a stepped perimeter outside the second transparent substrate for defining a shoulder on the stepped perimeter, the orientation inspector for inspecting the LCD cell comprising;

a main body having a hoister for lowering the main body to a predetermined position to stop the edge of the LCD cell; and a sensor disposed in the main body for detecting the existence of the stepped perimeter of the LCD cell below the main body and determining the orientation of the LCD cell.

2. The orientation inspector for LCD cell as claimed in claim 1, wherein the predetermined position is within the range of the shoulder so that the sensor contacts the shoulder of the second transparent substrate for detecting the existence of the stepped perimeter.

3. The orientation inspector for LCD cell as claimed in claim 2, wherein when the sensor detects the stepped perimeter, the orientation of the LCD cell is correct.

4. The orientation inspector for LCD cell as claimed in claim 2, wherein when the sensor does not detect the stepped perimeter, the orientation of the LCD cell is correct.

5. The orientation inspector for LCD cell as claimed in claim 1, further comprising a conveyor belt for transporting the LCD cell.

6. The orientation inspector for LCD cell as claimed in claim 5, wherein the hoister lifts the sensor to permit the passage of the LCD cell after the inspection of the LCD cell.

7. The orientation inspector for LCD cell as claimed in claim 1, wherein the sensor is an optical sensor.

8. The orientation inspector for LCD cell as claimed in claim 1, wherein the sensor includes an optical fiber.

9. The orientation inspector for LCD cell as claimed in claim 1, wherein the sensor has a side wall having a predetermined thickness such that when the sensor identifies the orientation of the LCD cell, the sensor identifies the position of the LCD cell.

* * * * *